United States Patent
Ryeland et al.

(10) Patent No.: US 12,261,509 B2
(45) Date of Patent: Mar. 25, 2025

(54) ACTUATOR WITH REDUCED AXIAL LENGTH AND ACCESSORY INCORPORATING SAME

(71) Applicant: LITENS AUTOMOTIVE PARTNERSHIP, Woodbridge (CA)

(72) Inventors: Geoffrey William Ryeland, North York (CA); Ercong Ji, Scarborough (CA); Matthew Viola, Woodbridge (CA); Alin Pop, Woodbridge (CA)

(73) Assignee: LITENS AUTOMOTIVE PARTNERSHIP, Woodbridge (CA)

(*) Notice: Subject to any disclaimer, the term of this patent is extended or adjusted under 35 U.S.C. 154(b) by 137 days.

(21) Appl. No.: 18/042,382

(22) PCT Filed: Aug. 23, 2021

(86) PCT No.: PCT/CA2021/051166
§ 371 (c)(1),
(2) Date: Feb. 21, 2023

(87) PCT Pub. No.: WO2022/036464
PCT Pub. Date: Feb. 24, 2022

(65) Prior Publication Data
US 2023/0336051 A1 Oct. 19, 2023

Related U.S. Application Data

(60) Provisional application No. 63/068,689, filed on Aug. 21, 2020.

(51) Int. Cl.
*F16K 31/04* (2006.01)
*F16H 19/08* (2006.01)
(Continued)

(52) U.S. Cl.
CPC .............. *H02K 7/116* (2013.01); *F16H 19/08* (2013.01); *F16K 31/047* (2013.01); *H02K 3/26* (2013.01); *H02K 21/24* (2013.01); *H02K 2203/03* (2013.01)

(58) Field of Classification Search
CPC ......... F16K 31/535; F16K 11/08; H02K 3/26; H02K 7/116; H02K 16/02; H02K 21/12; H02K 21/24; H02K 21/26; F01L 1/352
See application file for complete search history.

(56) References Cited

U.S. PATENT DOCUMENTS

| 4,077,424 A | * | 3/1978 | Ehret | ..................... F16K 11/074 |
| | | | | 137/119.07 |
| 7,109,625 B1 | | 9/2006 | Jore et al. | |

(Continued)

FOREIGN PATENT DOCUMENTS

| DE | 29924088 U1 * | 11/2001 | ............ E05F 11/483 |
| DE | 102005053119 A1 | 5/2007 | |
| JP | 4877745 B2 | 2/2012 | |

OTHER PUBLICATIONS

Machine English translation of DE-29924088-U1 (Year: 2024).*
International Search Report and Written Opinion for PCT/CA2021/051166 mailed Nov. 3, 2021.

*Primary Examiner* — Hailey K. Do
(74) *Attorney, Agent, or Firm* — Aird & McBurney LP (57) ABSTRACT

In an aspect, an actuator is provided and includes an axial flux motor and an epicycloid gear arrangement. The axial flux motor has a motor stator and a rotor, the rotor defining a rotor axis and having a motor output shaft. The motor output shaft has a first shaft portion that is coaxial with the rotor axis and a second shaft portion that is offset from the rotor axis. The epicycloid gear arrangement includes a ring gear, a cycloid gear, and a gear arrangement output member. The cycloid gear is rotatably mounted to the second shaft (Continued)

portion of the motor output shaft such that rotation of the motor output shaft drives the cycloid gear about the ring gear. The gear arrangement output member is driven rotationally by the cycloid gear about a gear arrangement output member axis that is fixed.

8 Claims, 8 Drawing Sheets

(51) Int. Cl.
    *H02K 3/26*       (2006.01)
    *H02K 7/116*     (2006.01)
    *H02K 21/24*     (2006.01)

(56) References Cited

U.S. PATENT DOCUMENTS

| | | | |
|---|---|---|---|
| 8,350,428 B2 * | 1/2013 | Heichel | H02K 16/00 |
| | | | 366/128 |
| 10,141,803 B2 | 11/2018 | Schuler et al. | |
| 2015/0005130 A1 | 1/2015 | Yamamoto et al. | |
| 2020/0114725 A1 * | 4/2020 | Kanzaki | F01P 7/165 |
| 2020/0256472 A1 * | 8/2020 | Henker | F16K 5/0663 |

* cited by examiner

ACTUATOR WITH REDUCED AXIAL LENGTH AND ACCESSORY INCORPORATING SAME

CROSS-REFERENCE TO RELATED APPLICATIONS

This application claims the benefit of U.S. provisional application No. 63/068,689, filed Aug. 21, 2020, the contents of which are incorporated herein by reference in their entirety.

FIELD OF THE DISCLOSURE

This disclosure relates generally to actuators for devices and more particularly to actuators for accessories in a vehicle, to move an accessory element between a first operational position and a second operational position.

BACKGROUND

Vehicles, such as electric vehicles, or vehicles with internal-combustion engines typically employ one or more valves that direct coolant flow to various heat loads. These valves employ valve elements that are movable between a plurality of operational positions, which direct coolant flow as needed, based on various operating conditions for the vehicle. A powered actuator is used to drive the valve element between the plurality of operational positions.

In some instances, the available room for the actuator is limited. Accordingly, there is a need for a powered actuator that is relatively small in at least one dimension.

SUMMARY

In an aspect, an actuator is provided and includes an axial flux motor and an epicycloid gear arrangement. The axial flux motor has a motor stator and a rotor, the rotor defining a rotor axis and having a motor output shaft. The motor output shaft has a first shaft portion that is coaxial with the rotor axis and a second shaft portion that is offset from the rotor axis. The epicycloid gear arrangement includes a ring gear, a cycloid gear, and a gear arrangement output member. The cycloid gear is rotatably mounted to the second shaft portion of the motor output shaft such that rotation of the motor output shaft drives the cycloid gear about the ring gear. The gear arrangement output member is driven rotationally by the cycloid gear about a gear arrangement output member axis that is fixed.

In another aspect, an accessory for a vehicular cooling system is provided and includes a multi-channel valve and an actuator. The multi-channel valve includes a valve housing and a valve element that is pivotable about a valve axis. The valve housing includes at least three ports. The valve element is positionable in a first valve element position in which the valve element fluidically connects a first set of ports selected from the at least three ports, and a second valve element position in which the valve element fluidically connects a second set of ports selected from the at least three ports, that is different than the first group of ports. The axial flux motor includes an axial flux motor and an epicycloid gear arrangement. The axial flux motor has a motor stator and a rotor, the rotor defining a rotor axis and having a motor output shaft. The motor output shaft has a first shaft portion that is coaxial with the rotor axis and a second shaft portion that is offset from the rotor axis. The epicycloid gear arrangement includes a ring gear, a cycloid gear, and a gear arrangement output member. The cycloid gear is rotatably mounted to the second shaft portion of the motor output shaft such that rotation of the motor output shaft drives the cycloid gear about the ring gear. The gear arrangement output member is operatively connected to the valve element, and is driven rotationally by the cycloid gear about a gear arrangement output member axis that is fixed.

BRIEF DESCRIPTION OF THE DRAWINGS

The foregoing and other aspects of the invention will be better appreciated with reference to the attached drawings.

DETAILED DESCRIPTION OF EXAMPLE EMBODIMENTS

For simplicity and clarity of illustration, where considered appropriate, reference numerals may be repeated among the drawings to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the drawings and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Figure 1A:
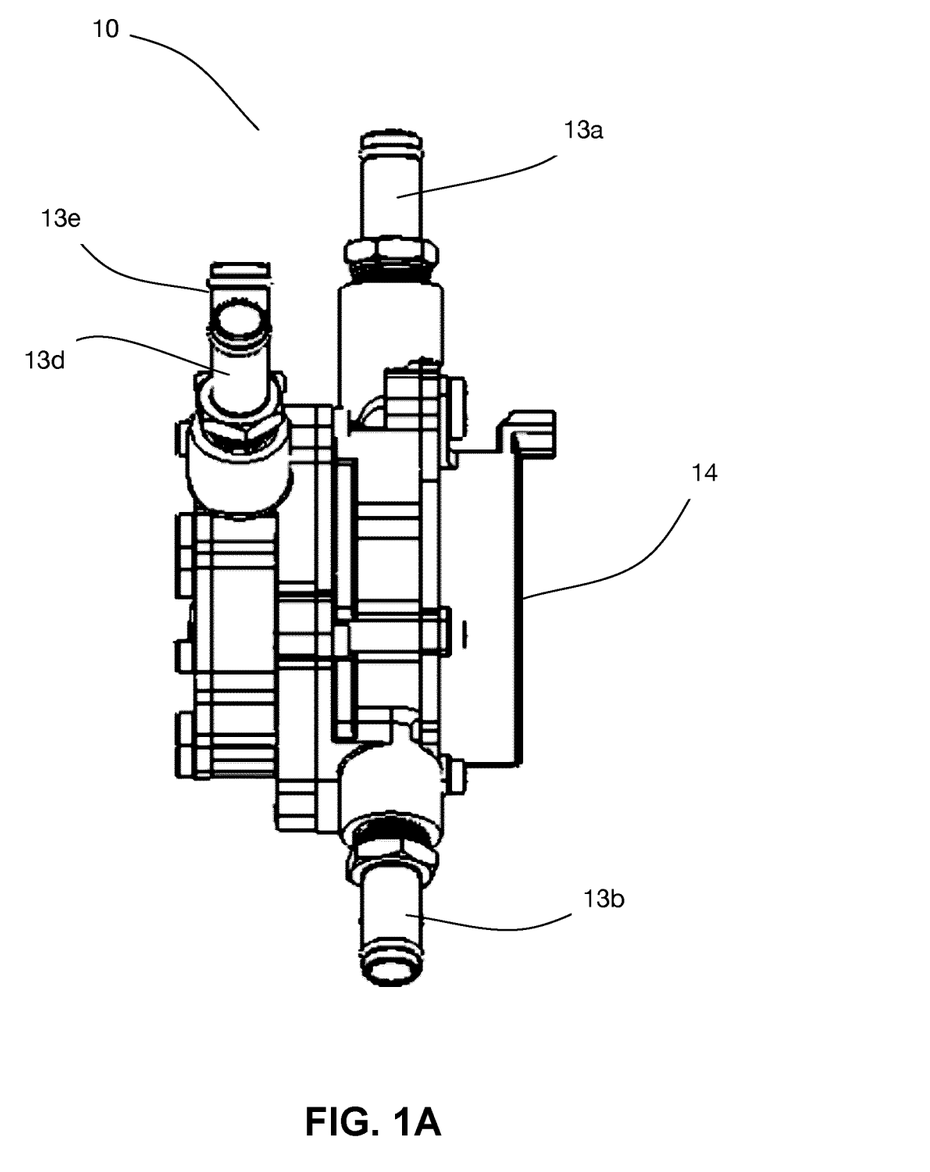
FIG. 1A is a side view of an accessory for a vehicular cooling system, in accordance with an embodiment of the present disclosure.
Figure 1B:
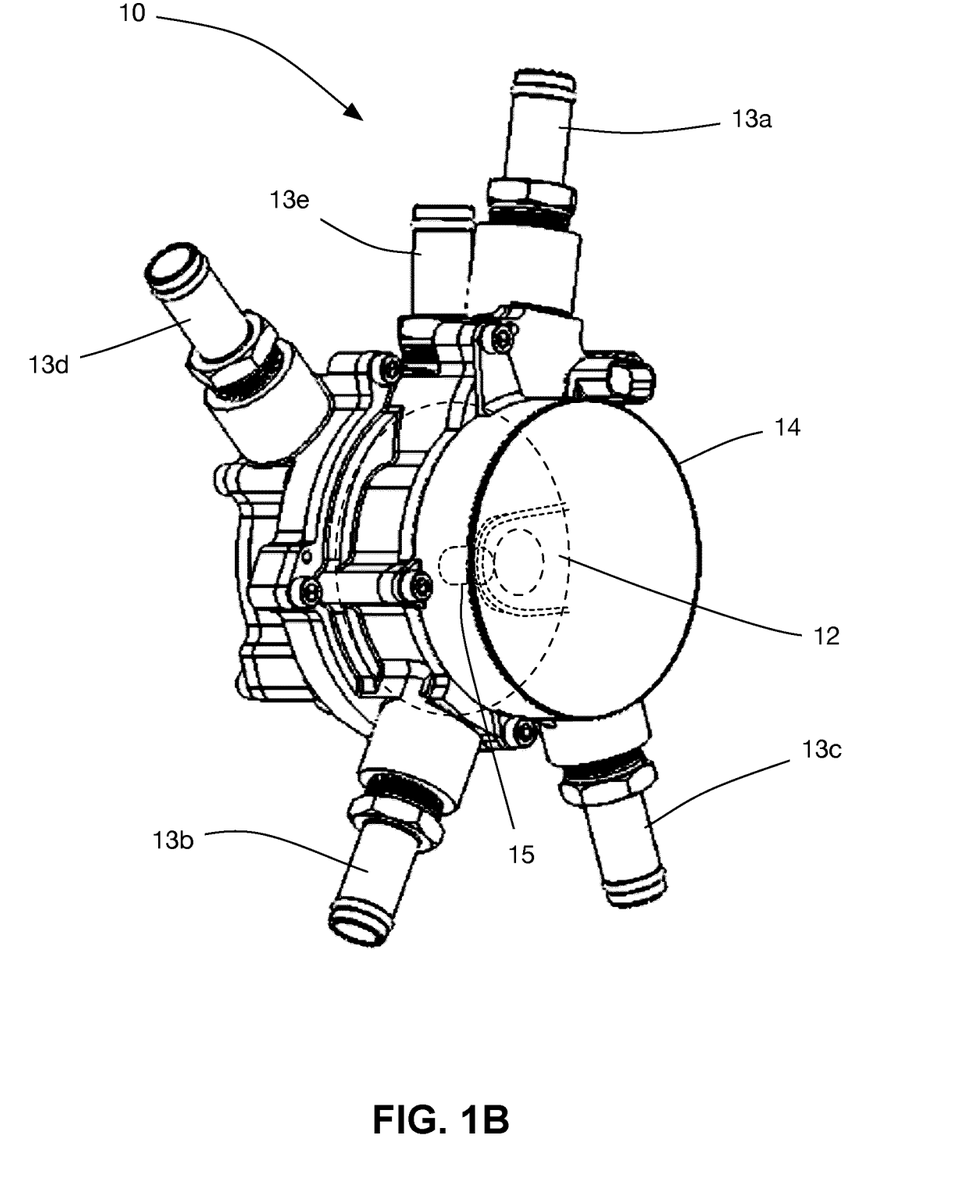
FIG. 1B is a perspective view of the accessory shown in FIG. 1A with an operational element thereof shown in a first operational position.
Figure 1C:
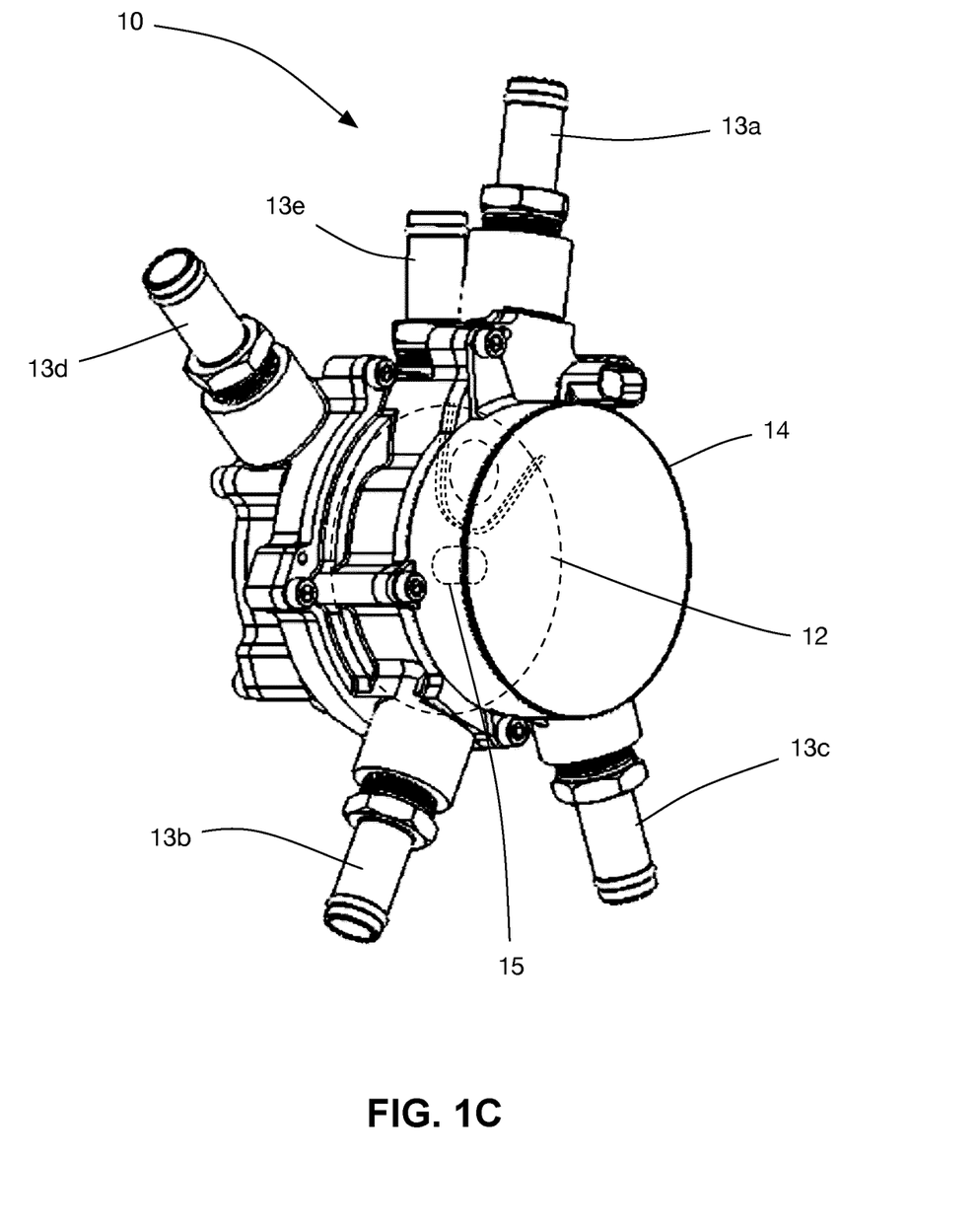
FIG. 1C is a perspective view of the accessory shown in FIG. 1A with the operational element thereof shown in a second operational position.

Reference is made to FIGS. 1A, 1B and 1C, which shows an accessory that is for use in a vehicle (not shown), and which may be referred to as a vehicular accessory 10. The accessory 10 includes an operational element 12 that is movable between a first operational position, shown in FIG. 1B and a second operational position, shown in FIG. 1C. In the example shown, the accessory 10 is a valve and the operational element 12 is a valve element that is movable to the first and second operational positions to permit fluid communication between different combinations of ports of the valve. The valve includes at least three ports. In the present example, the valve includes five ports shown at 13a, 13b, 13c, 13d and 13e.

Put another way, the valve element is positionable in a first valve element position in which the valve element fluidically connects a first set of ports selected from the at least three ports, and a second valve element position in which the valve element fluidically connects a second set of ports selected from the at least three ports, that is different than the first group of ports.

The valve may have any suitable structure. For example, the valve may be a valve as disclosed in PCT publication WO2019/183725, published on Oct. 3, 2019, the contents of which are incorporated herein by reference in their entirety.

The accessory 10 includes an actuator 14 that is operatively connected to the operational element 12 to move the operational element 12 between the first and second operational positions.

Figure 2:
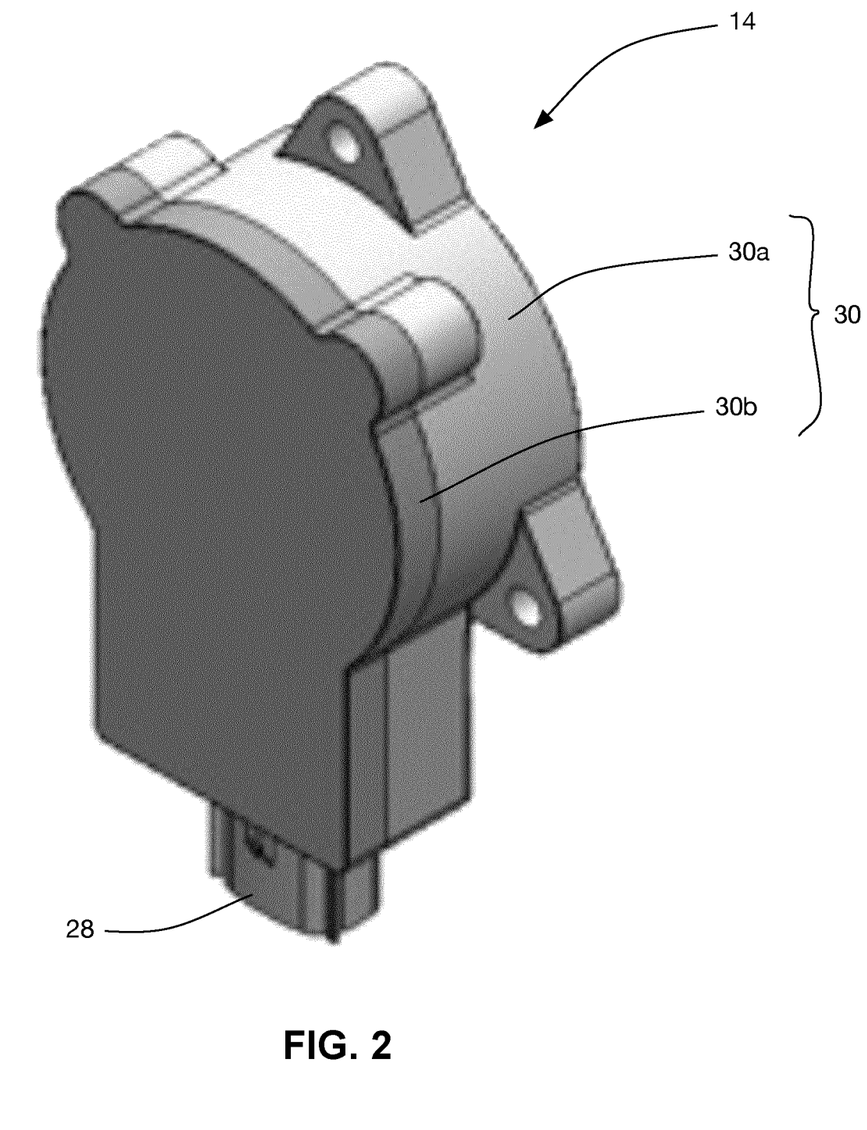
FIG. 2 is a perspective view of an actuator for the accessory shown in FIG. 1.
Figure 3:
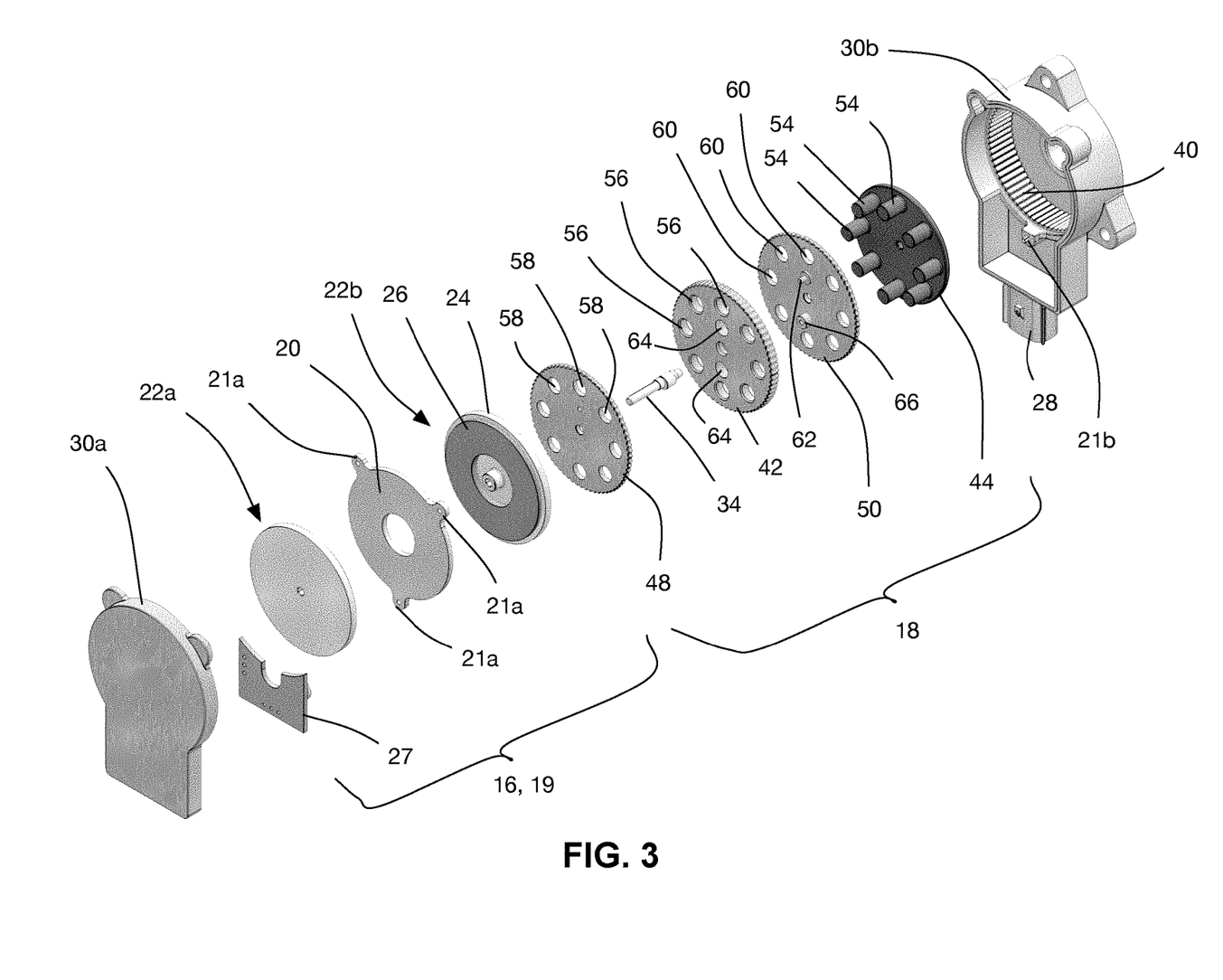
FIG. 3 is an exploded perspective view of the actuator shown in FIG. 2.
Figures 4, 5A, 5B:
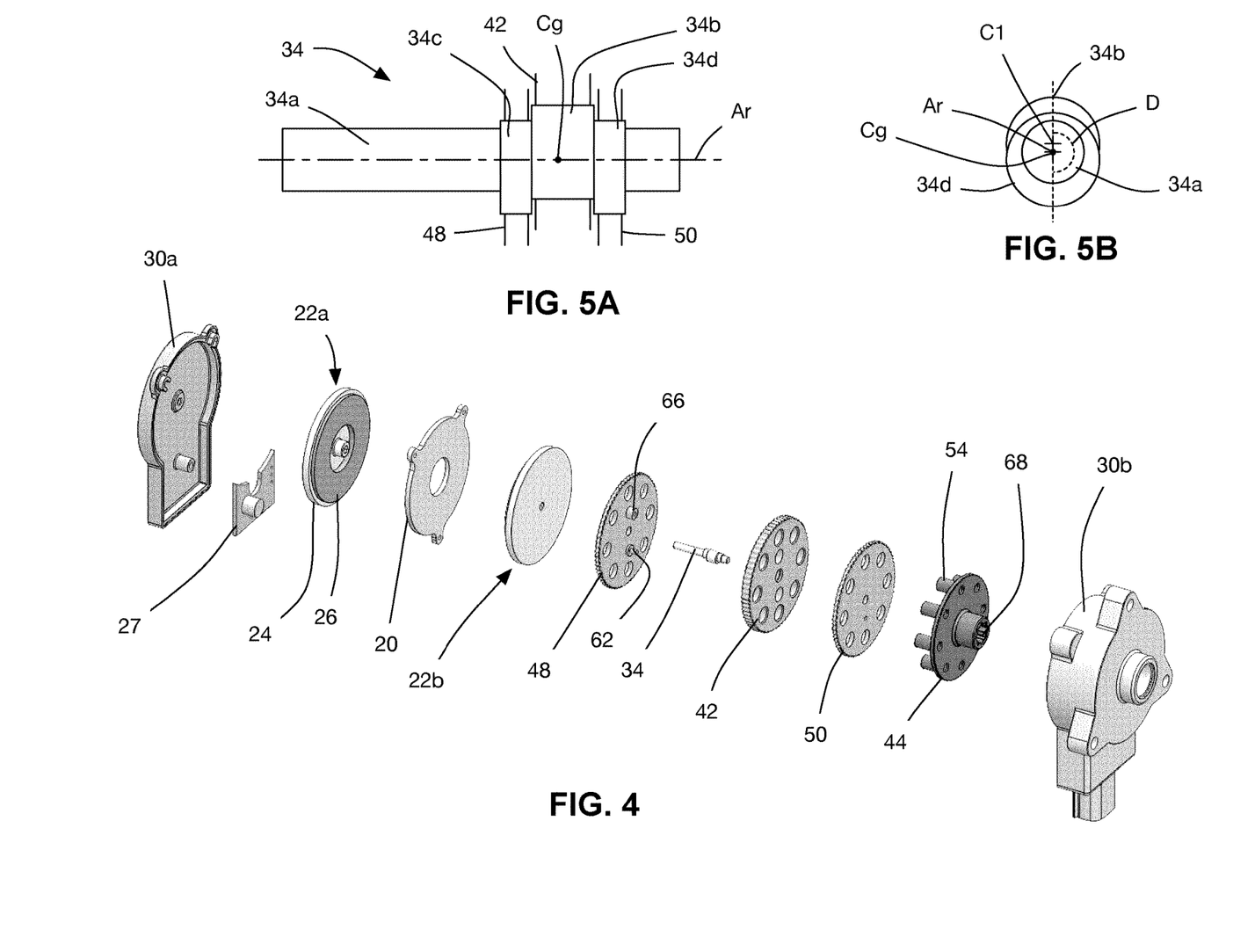
FIG. 4 is another exploded perspective view of the actuator shown in FIG. 2.
FIG. 5A is a plan view of a motor output shaft that is part of the actuator shown in FIGS. 3 and 4.
FIG. 5B is an end view of the motor output shaft shown in FIG. 5A.

The actuator 14 includes an axial flux motor 16 and an epicycloid gear arrangement 18. The axial flux motor 16 in the example shown herein is a PCB motor 19 and incorporates a single stator 20 that is fixed to a housing (shown at 30) via apertured tabs 21a and projections 21b. A first rotor 22a is positioned on a first axial side of the stator 20 and a second rotor 22b is positioned on a second axial side of the stator 20. However, in other embodiments the PCB motor 19 could incorporate a single rotor (e.g. the rotor 22a) instead of two rotors, or could alternatively have some other arrangement.

Each of the first and second rotors 22a and 22b includes a rotor base 24 and a plurality of magnets (e.g. permanent magnets), which are represented, for simplicity, as a layer of material 26 on the rotor base 24 in the figures. It will be understood, however, that the plurality of magnets may have any suitable shape and any suitable layout contemplated in the art of axial flux motors.

The stator 20 is, in the present embodiment, a PCB, with electric traces (not individually shown, but which would be understood to be present by one skilled in the art) on it that are suitable to transmit current in order to drive rotation of the first and second rotors 22a and 22b. A motor controller is shown at 27 in the form of another PCB, which controls electric current to the stator 20. Electric power may be transmitted to the PCB motor 19 by a terminal block 28 that forms part of a housing 30 for the actuator 14, and which is electrically connectable to a power cable extending from a power source (e.g. a battery) in the vehicle.

The housing 30 may include, as shown, a first housing portion 30a and a second housing portion 30b that are joined together in any suitable way such as by thermal bonding, and/or by means of an adhesive to enclose an interior 32 (FIG. 6) of the actuator 14.

First and second rotors 22a and 22b may be connected to (e.g. rotationally fixed to) a motor output shaft shown at 34. A first end 36 (FIG. 6) of the motor output shaft 34 may be rotationally supported in a first end support aperture 38 that is positioned in the first housing portion 30a. Rotation of the first and second rotors 22a and 22b, which is caused by passing current through the stator 20, drives rotation of the motor output shaft 34 about a rotor axis Ar.

It is possible that, in some embodiments a different configuration of motor may be usable instead of an axial flux motor.

Referring to FIGS. 5A and 5B, the motor output shaft 34 has a first shaft portion 34a that is coaxial with the rotor axis Ar, and a second shaft portion 34b that is offset from the rotor axis Ar. In the example shown, the motor output shaft 34 further includes a third shaft portion 34c that is offset from the rotor axis Ar and which is angularly offset from the second shaft portion about the rotor axis Ar by a selected angular offset D as shown in FIG. 5B, and a fourth shaft portion 34d that is offset from the rotor axis Ar and which is angularly offset from the second shaft portion 34b about the rotor axis Ar by the selected angular offset D. As can be seen, the third shaft portion 34c is axially on a first side of the second shaft portion 34b and the fourth shaft portion 34d is axially on a second side of the second shaft portion 34b.

Referring to FIGS. 3 and 4, the epicycloid gear arrangement 18 includes a ring gear 40, a cycloid gear 42, and a gear arrangement output member 44. In the present example, the ring gear 40 is fixed in position and is integral with the housing 30. Additionally, in the present example, the cycloid gear 42 is a first cycloid gear that is part of a plurality of cycloid gears that further includes a second cycloid gear 48 and a third cycloid gear 50.

The first cycloid gear 42 is rotatably mounted to the second shaft portion 34b of the motor output shaft 34, such that rotation of the motor output shaft 34 drives the second shaft portion 34b about the rotor axis Ar, which drives the first cycloid gear 42 about the ring gear 40 in a cycloidal manner. Similarly, the second and third cycloid gears 48 and 50 are rotatably mounted to the third and fourth shaft portions 34c and 34d of the motor output shaft 34, such that rotation of the motor output shaft 34 drives the third and fourth shaft portions 34c and 34d about the rotor axis Ar, which drives the second and third cycloid gears 48 and 50 cycloidally about the ring gear 40.

It will be noted that the total mass of the second and third cycloid gears 48 and 50 is approximately equal to the mass of the first cycloid gear 42. In the particular example shown, the second and third cycloid gears 48 and 50 are each approximately one half of the width of the first cycloid gear 42, and are each approximately one half of the mass of the first cycloid gear 42. The selected angular offset between the second shaft portion 34b and the third and fourth shaft portions 34c and 34d may be selected such that a center of mass Cg of the combination of the plurality of cycloid gears and the motor output shaft 34 is positioned approximately on the rotor axis Ar.

For the purpose of clarity, the phrase "approximately on the rotor axis Ar" is intended to mean, in some embodiments, less than have of the distance between the rotor axis Ar and the offset between the rotor axis Ar and the center of rotation of the first cycloid gear 42 (shown at C1 in FIG. 5B).

Figure 6:
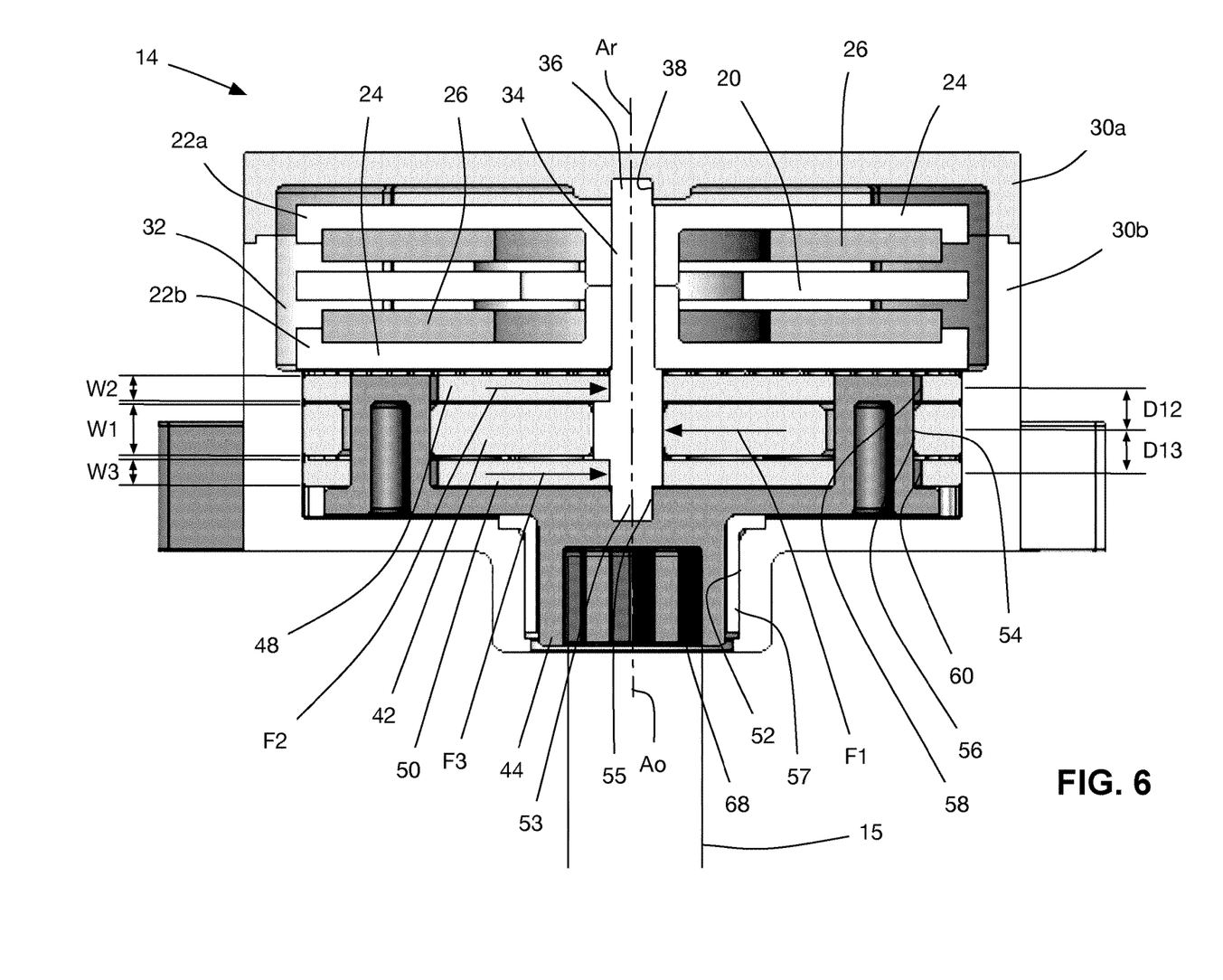
FIG. 6 is a sectional view of the actuator shown in FIG. 2.

It will be noted that, during rotation of the motor output shaft 34, the first cycloid gear 42 imposes a first radial force F1 (as shown in FIG. 6) on the motor output shaft 34. The first radial force F1 results at least in part from a force applied to the first cycloid gear 42 by the ring gear 40 during engagement therebetween.

The second and third cycloid gears 48 and 50 impose second and third radial forces F2 and F3, respectively, on the motor output shaft 34, which result from forces applied to the second and third cycloid gears 48 and 50, respectively by the ring gear 40 during engagement between the ring gear 40 and the second and third cycloid gears 48 and 50.

The widths (shown at W1, W2 and W3, respectively) of the first, second and third cycloid gears 48 and 50 and the center distances between the first cycloid gear 42 and each of the second and third cycloid gears 48 and 50, respectively, may be selected such that, there is approximately no net moment imposed on the motor output shaft 34 by the first, second and third radial forces F1, F2 and F3. The center distance between the first and second cycloid gears 42 and 48 may be referred to as a first center distance D12, and the center distance between the first and third cycloid gears 42 and 50 may be referred to as a second center distance D13.

Worded more broadly, each of the plurality of cycloid gears engages the ring gear 40 and applies a radial force on the motor output shaft as a result, and wherein a width of each of the plurality of cycloid gears, and the center distances between the plurality of gears relative to each other may be selected such that, there is substantially no net moment imposed on the motor output shaft 34 by the radial forces. The phrase "substantially no net moment" is intended to mean, in some embodiments, that any moment that is imposed on the motor output shaft 34 by the radial forces is less than about 25% of the moment that is imposed on the motor output shaft 34 by the first radial force F1.

In the example shown, the width W1 of the first cycloid gear is approximately two times each of the widths W2 and W3 of the second cycloid gear 48 and of the third cycloid gear 50, and the first and second center distances D12 and D13 between the first cycloid gear 42 and the second cycloid gear 48, and between the first cycloid gear 42 and the third cycloid gear 50 are approximately equal. The phrase "approximately two times the width W2" is intended to mean, in some embodiments, that two times the width W2 is within 10% of the width W1. The phrase "the first and second center distances D12 and D13 . . . are approximately equal" is intended to mean, in some embodiments, that that the second center distance D13 is within 10% of the first center distance D12.

The gear arrangement output member 44 is rotatable about a gear arrangement output member axis Ao that is fixed. In the embodiment shown, the gear arrangement output member 44 is rotatably supported in a gear arrangement output member support aperture 52 in the housing 30. As can be seen in FIG. 6, a second end 53 of the motor output shaft 34 is rotatably supported in a second end support aperture 55 that is in the gear arrangement output member 44. As can be seen in FIG. 6, a bushing shown at 57 rotatably supports the gear arrangement output member 44 in the gear arrangement output member support aperture 52. Furthermore, there is directly rotational support of the first, second and third cycloid gears 42, 48 and 50 on the motor output shaft 34, and direct rotational support of the first end 36 of the motor output shaft 34 in the first end support aperture 38. To achieve the rotational movement of the various components relative to one another, the interior 32 of the housing 30 may contain a suitable lubricant.

It is alternatively possible to employ bearings, such as ball bearings, as needed, for operation of the various rotating components.

The gear arrangement output member 44 has a plurality of axial drive projections 54 which are positioned in a plurality of first drive apertures 56 in the first cycloid gear 42, and, in embodiments where the second and third cycloid gears 48 and 50 are present, the axial drive projections 54 are positioned in a plurality of second drive apertures 58 in the second cycloid gear 48, and in a plurality of third drive apertures 60 in the third cycloid gear 50.

Rotation of the motor output shaft 34 is caused by operation of the axial flux motor 16. The rotation of the motor output shaft 34 itself causes cycloidal movement of the first cycloid gear 42 about the ring gear 40, and, in embodiments in which the second and third cycloid gears 48 and 50 are present, cycloidal movement of the second and third cycloid gears 48 and 50 about the ring gear 40.

As a result of engagement between the axial drive projections 54 and the first drive apertures 56, the cycloidal movement of the first cycloid gear 42 during operation of the axial flux motor 16 drives the gear arrangement output member 44 rotationally by the first cycloid gear 42 about the gear arrangement output member axis Ao. Similarly, in embodiments where the second and third cycloid gears 48 and 50 are present, the engagement of the axial drive projections 54 in the second and third drive apertures 58 and 60 cause the second and third cycloid gears 48 and 50 to drive the gear arrangement output member 44 rotationally about the gear arrangement output member axis Ao during their cycloidal movement.

Optionally, a pass-through connector 62 connects the second and third cycloid gears 48 and 50 together. The pass-through connector 62 passes through a pass-through aperture 64 in the first cycloid gear 42, that is sized sufficiently that there is clearance between the pass-through aperture 64 and the pass-through connector 62. In other words, there is no engagement between the pass-through connector 62 and the pass-through aperture 64 throughout operation of the actuator 14.

The pass-through connector 62 may be a bar that extends from one of the second and third cycloid gears 48 and 50 into a connector receiving aperture 66 in a cylindrical member that is on the other of the second and third cycloid gears 48 and 50. In the embodiment shown, there are two pass-through connectors 62 and two connector receiving apertures 66 that are positioned in order that the second and third cycloid gears 48 and 50 remain approximately equal in mass and to keep the Cg as noted above, approximately on the rotor axis Ar.

It will be noted that there is no housing wall from the housing 30 extending inwardly to separate the motor 16 and the epicycloid gear arrangement 18. This helps to reduce an axial dimension (thickness) of the actuator 14 even further.

The gear arrangement output member 44 has an output connection feature 68 (e.g. a ribbed aperture) that mates with a complementary input connection feature 15 on the operational element 12 so as to operatively connect the gear arrangement output member 44 to the operational element 12 (i.e. the valve element in the example shown) so as to drive the operational element 12 to move between the first and second operational positions. The input connection feature 15 is shown as a simple round shaft in the figures, for simplicity, however it will be noted that the input connection feature 15 may be a ribbed shaft end that is complementary to the ribbed aperture shown in FIGS. 4 and 6. The operational element 12 may be movable to more than just first and second operational positions.

Figure 7:
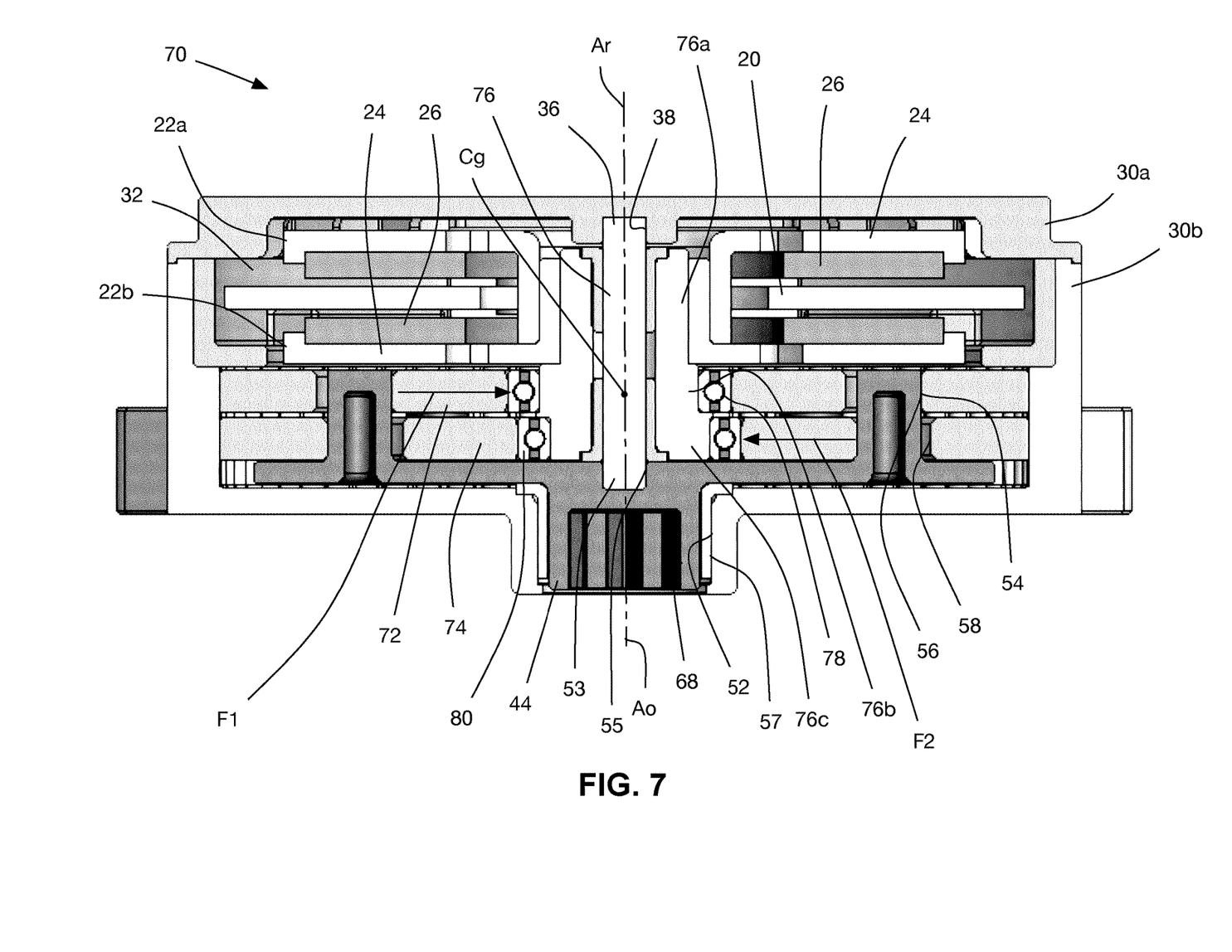
FIG. 7 is a sectional view of an actuator in accordance with another embodiment of the present disclosure

Reference is made to FIG. 7, which shows actuator 70 that is similar to the actuator 14, but which includes an epicycloid gear arrangement that only has a first cycloid gear 72 and a second cycloid gear 74. The first cycloid gear 72 may be similar to the first cycloid gear 42 in the embodiment shown in FIG. 6. The second cycloid gear 74 may have a thickness and mass that is similar to those of the first cycloid gear 72. The motor output shaft in FIG. 7 is shown at 76 and it may have a first shaft portion 76a that is concentric with the rotor axis Ar, a second shaft portion 76b that is similar to the second shaft portion 34b, and a third shaft portion 76c that is offset from the rotor axis Ar and which is at a selected angular offset (e.g. about 180 degrees) relative to the second shaft portion 76b so as to provide a center of mass Cg for the combination of the motor output shaft 76 and the first and second cycloid gears 72 and 74 that is approximately on the rotor axis Ar. As a result, of only having the first and second cycloid gears 72 and 74, there may be a moment that is induced on the motor output shaft 76 by the radial forces shown at F1 and F2, which is compensated for by the elements that support the motor output shaft 76 in place, namely the first end support aperture 38 and the second end support aperture 55. In the embodiment shown, ball bearings shown at 78 and 80 are provided to rotationally support the first and second cycloid gears 72 and 74 on the motor output shaft 76.

While an embodiment with three cycloid gears is shown, and an embodiment with two cycloid gears is shown, it is alternatively possible to provide an embodiment with a single cycloid gear, or an embodiment with four or more cycloid gears. It will be understood that a single cycloid gear may induce a bending force F1 that is not cancelled except by the elements that support the motor output shaft, and may induce a moment that is not cancelled except by these elements. Accordingly, the embodiment with two cycloid gears shown in FIG. 7 is advantageous over an embodiment with a single cycloid gear, and the embodiment with three cycloid gears shown in FIG. 6 is advantageous (by cancelling the moment referred to above) over the embodiment shown in FIG. 7.

In general, actuators as described and shown herein provide actuation capability while being very compact axially (i.e., in the directions of the rotor axis Ar and the gear arrangement output member axis Ao, and the accessory drive axis Aa). In some embodiments, the actuators as described and shown herein may also be quite compact radially. In some embodiments, the actuator 14 shown in FIGS. 2-6 occupies an overall volume of 118 cm^3 and has a mass of 177 g, and generates rotary movement of the gear arrangement output member 44 at 5 rpm, at a torque of 1 Nm.

Those skilled in the art will appreciate that the embodiments disclosed herein can be modified or adapted in various other ways whilst still keeping within the scope of the appended claims.

What is claimed is:

1. An actuator, comprising:
an axial flux motor having a motor stator and a rotor, the rotor defining a rotor axis and having a motor output shaft, the motor output shaft having a first shaft portion that is coaxial with the rotor axis and a second shaft portion that is offset from the rotor axis; and
an epicycloid gear arrangement including a ring gear, a cycloid gear, and a gear arrangement output member, wherein the cycloid gear is rotatably mounted to the second shaft portion of the motor output shaft such that rotation of the motor output shaft drives the cycloid gear about the ring gear, wherein the gear arrangement output member is driven rotationally by the cycloid gear about a gear arrangement output member axis that is fixed,
wherein the motor output shaft has a third shaft portion that is offset from the rotor axis and which is angularly offset from the second shaft portion about the rotor axis by a selected angular offset, and a fourth shaft portion that is offset from the rotor axis and which is angularly offset from the second shaft portion about the rotor axis by the selected angular offset, wherein the third shaft portion is axially on a first side of the second shaft portion and the fourth shaft portion is axially on a second side of the second shaft portion,
wherein the cycloid gear is a first cycloid gear that is part of a plurality of cycloid gears including a second cycloid gear and a third cycloid gear, wherein the second and third cycloid gears are rotatably mounted to the third shaft portion and the fourth shaft portion, respectively, such that rotation of the motor output shaft drives the second and third cycloid gears about the ring gear,
wherein the selected angular offset is selected such that a center of mass of the plurality of cycloid gears and the motor output shaft is approximately on the rotor axis,
wherein engagement between each of the first, second and third cycloid gears and the ring gear applies a first radial force, a second radial force, and a third radial force, respectively, on the motor output shaft,
wherein each of the first, second, and third cycloid gears each have a width, and wherein there is a first center distance between the first and second cycloid gears and a second first center distance between the first and third cycloid gears, and wherein the widths of the first, second and third cycloid gears, and the first and second center distances are selected such that, there is approximately no net moment imposed on the motor output shaft by the first, second and third radial forces,
wherein the gear arrangement output member is further driven rotationally by the second and third cycloid gear about the gear arrangement output member axis.

2. An actuator as claimed in claim 1, further comprising a pass-through connector that connects the second and third cycloid gears together, and which passes through a pass-through aperture in the first cycloid gear, wherein the pass-through aperture is sized sufficiently that there is clearance between the pass-through aperture and the pass-through connector.

3. An actuator as claimed in claim 1, wherein the rotor is a first rotor that is positioned on a first axial side of the stator and the axial flux motor further includes a second rotor on a second axial side of the stator.

4. An actuator as claimed in claim 3, wherein the axial flux motor is a PCB motor.

5. An accessory for a vehicular cooling system, comprising:
- a multi-channel valve including a valve housing and a valve element that is pivotable about a valve axis, the valve housing including at least three ports, wherein the valve element is positionable in a first valve element position in which the valve element fluidically connects a first set of ports selected from the at least three ports, and a second valve element position in which the valve element fluidically connects a second set of ports selected from the at least three ports, that is different than the first group set of ports; and
- an actuator including
  - an axial flux motor having a motor stator and a rotor, the rotor defining a rotor axis and having a motor output shaft, the motor output shaft having a first shaft portion that is coaxial with the rotor axis and a second shaft portion that is offset from the rotor axis; and
  - an epicycloid gear arrangement including a ring gear, a cycloid gear, and a gear arrangement output member, wherein the cycloid gear is rotatably mounted to the second shaft portion of the motor output shaft such that rotation of the motor output shaft drives the cycloid gear about the ring gear, wherein the gear arrangement output member is operatively connected to the valve element, and is driven rotationally by the cycloid gear about a gear arrangement output member axis that is fixed,
- wherein the motor output shaft has a third shaft portion that is offset from the rotor axis and which is angularly offset from the second shaft portion about the rotor axis by a selected angular offset, and a fourth shaft portion that is offset from the rotor axis and which is angularly offset from the second shaft portion about the rotor axis by the selected angular offset, wherein the third shaft portion is axially on a first side of the second shaft portion and the fourth shaft portion is axially on a second side of the second shaft portion,
- wherein the cycloid gear is a first cycloid gear that is part of a plurality of cycloid gears including a second cycloid gear and a third cycloid gear, wherein the second and third cycloid gears are rotatably mounted to the third shaft portion and the fourth shaft portion, respectively, such that rotation of the motor output shaft drives the second and third cycloid gears about the ring gear,
- wherein the selected angular offset is selected such that a center of mass of the plurality of cycloid gears and the motor output shaft is approximately on the rotor axis,
- wherein engagement between each of the first, second and third cycloid gears and the ring gear applies a first radial force, a second radial force, and a third radial force, respectively, on the motor output shaft,
- wherein each of the first, second, and third cycloid gears each have a width, and wherein there is a first center distance between the first and second cycloid gears and a second first center distance between the first and third cycloid gears, and wherein the widths of the first, second and third cycloid gears, and the first and second center distances are selected such that, there is approximately no net moment imposed on the motor output shaft by the first, second and third radial forces,
- wherein the gear arrangement output member is further driven rotationally by the second and third cycloid gear about the gear arrangement output member axis.

6. An accessory as claimed in claim 5, further comprising a pass-through connector that connects the second and third cycloid gears together, and which passes through a pass-through aperture in the first cycloid gear, wherein the pass-through aperture is sized sufficiently that there is clearance between the pass-through aperture and the pass-through connector.

7. An accessory as claimed in claim 5, wherein the rotor is a first rotor that is positioned on a first axial side of the stator and the axial flux motor further includes a second rotor on a second axial side of the stator.

8. An accessory as claimed in claim 7, wherein the axial flux motor is a PCB motor.

* * * * *